(12) United States Patent
Kontz

(10) Patent No.: US 7,875,143 B2
(45) Date of Patent: Jan. 25, 2011

(54) METHOD AND APPARATUS FOR LABELING CONTAINERS

(75) Inventor: Robert F. Kontz, Toledo, OH (US)

(73) Assignee: GerroPlast GmbH, Dusseldorf (DE)

( * ) Notice: Subject to any disclaimer, the term of this patent is extended or adjusted under 35 U.S.C. 154(b) by 800 days.

(21) Appl. No.: 11/640,738

(22) Filed: Dec. 18, 2006

(65) Prior Publication Data

US 2007/0169874 A1 Jul. 26, 2007

Related U.S. Application Data

(60) Provisional application No. 60/760,850, filed on Jan. 20, 2006.

(51) Int. Cl.
| | |
|---|---|
| B29D 22/00 | (2006.01) |
| B65C 3/16 | (2006.01) |
| B65C 9/04 | (2006.01) |
| B65C 9/00 | (2006.01) |
| B65C 11/04 | (2006.01) |
| B29C 53/00 | (2006.01) |
| B31B 1/90 | (2006.01) |

(52) U.S. Cl. .................. 156/215; 156/213; 156/218; 156/456; 156/568; 156/578; 493/107

(58) Field of Classification Search .............. 156/84, 156/85, 86, 196, 213, 215, 217, 218, 250, 156/256, 264, 308.2, 308.4, 309.6, 443, 446, 156/447, 448, 449, 456, 457, 458, 486, 497, 156/539, 556, 558, 566, 567, 568; 53/441, 53/442, 582, 585; 493/62, 74, 105, 106, 493/107, 149, 150, 155; 72/715; 228/49.6

See application file for complete search history.

(56) References Cited

U.S. PATENT DOCUMENTS

| 3,111,063 | A | * | 11/1963 | Membrino | .................. 493/190 |
| 3,952,676 | A | * | 4/1976 | Rockefeller | ................... 413/1 |
| 3,970,492 | A | * | 7/1976 | Amberg et al. | ................ 156/85 |
| 4,100,841 | A | | 7/1978 | Amberg | |
| 4,210,477 | A | * | 7/1980 | Gillespie et al. | ............ 156/203 |
| 4,237,360 | A | | 12/1980 | Polhlenz | |
| 4,246,059 | A | | 1/1981 | Hadl | |
| 4,366,016 | A | * | 12/1982 | Golden, Jr. | .................. 156/218 |
| 4,443,679 | A | * | 4/1984 | Balordi | ....................... 219/618 |
| 4,545,832 | A | * | 10/1985 | Hoffmann | ..................... 156/86 |
| 4,555,296 | A | * | 11/1985 | Burtch et al. | ................ 156/446 |
| 4,587,075 | A | * | 5/1986 | Butcher et al. | .............. 264/573 |

(Continued)

OTHER PUBLICATIONS

International Search Report and The Written Opinion of the International Searching Authority (Sep. 26, 2007) (PCT/US07/00812).
Notification of Transmittal of International Preliminary Examination Report (Oct. 13, 2009).

*Primary Examiner*—Jeff H Aftergut
*Assistant Examiner*—Brian R Slawski
(74) *Attorney, Agent, or Firm*—Emch, Schaffer, Schaub & Porcello Co., L.P.A.

(57) ABSTRACT

A label for a container is formed by wrapping a length of label material around a cylindrical mandrel and introducing heat, adhesive or other sealing means into a gap between the leading end portion of the label material and the trailing end portion as the label material is wrapped around the mandrel. The cylindrical sleeve is slid off of the mandrel and telescoped over a container passing thereunder. The container with a cylindrical sleeve therearound is then moved to a heating station which heats the label material, preferably foam polystyrene, to cause it to shrink into conformity with the contour of the container.

7 Claims, 15 Drawing Sheets

U.S. PATENT DOCUMENTS

| | | |
|---|---|---|
| 4,704,173 A | 11/1987 | Hoffman |
| 4,718,961 A * | 1/1988 | Yamato et al. ............... 156/218 |
| 4,844,957 A | 7/1989 | Hoffman |
| 4,923,557 A * | 5/1990 | Dickey ........................ 156/86 |
| 4,977,002 A | 12/1990 | Hoffman |
| 5,176,607 A | 1/1993 | Hill et al. |
| 5,240,529 A | 8/1993 | Hoffman |
| 5,403,416 A | 4/1995 | Bright et al. |
| 5,403,635 A | 4/1995 | Hoffman |
| 5,415,721 A | 5/1995 | Nickey et al. |
| 5,505,813 A * | 4/1996 | Scheifele et al. ......... 156/380.1 |
| 6,066,223 A | 5/2000 | Gomes et al. |

* cited by examiner

METHOD AND APPARATUS FOR LABELING CONTAINERS

CROSS REFERENCE TO RELATED APPLICATION

This application is based on and claims the benefit of Provisional Application No. 60/760,850 filed Jan. 20, 2006.

BACKGROUND OF THE INVENTION

It has long been known to apply plastic or other heat shrinkable labels to bottles and other containers by wrapping a length of heat shrinkable label material around a container to form a sleeve around said container and then heating the sleeve to cause it to shrink into interfacial engagement with the sidewall of the container. In forming the sleeve it is important to have a good seal at the seam. This is accomplished by overlapping the edges and sealing the inside surface of a short portion adjacent one edge to the outside surface of a short portion adjacent the other edge either by solvent, adhesive or heating sealing. See for example U.S. Pat. No. 5,415,721 the disclosure of which is incorporated herein by reference.

According to one widely used process, a length of label material is wrapped around a mandrel and sealed. The sealed sleeve is then placed over the container from the top or bottom. The container and label are then exposed to heat causing the sleeve of the label material to shrink to the contour of the container. Since a separate mandrel was used to form the sleeve, the sleeve could be placed on fairly complex shaped containers and then shrunk.

Under another prior art process, a length of label stock is wrapped around the container, an adhesive is used to seal the leading and trailing edges of the label together and the combination is then heated to shrink the sleeve to the container forming the label. Although, this system provides a low cost method of applying a shrinkable label to the container, it is limited to containers having substantially cylindrical shapes. Thus, in this case the label stock was wrapped around the container and sealed using the container as a wrap mandrel in contrast to the previously described process in which the sleeve was formed by wrapping a length of label stock around a mandrel.

In the first described process a large, very expensive machine was needed to perform the required tasks. On one series of such machines, hot sealing bars were used to seal the leading and trailing edges to form the seam of the sleeves on the mandrel. In a modification of the mandrel process, hot air was directed to the desired sealing area. In both these cases (hot bar, hot air) the complexity of the sealing system not only required expensive mechanical systems, the change over from one container size or design to another required extended periods of time for the mechanical changes of the expensive tooling. It also required an extended period of time to bring the machine up to speed and proper temperature for heat sealing resulting in a great amount of expensive scrap being generated. Companies using the sleeve on mandrel approach usually had very long runs of the same container. As a result, the start up time, tooling cost and scrap rates were not major issues.

The present invention provides method and apparatus capable of labeling complex container shapes as can be done with the mandrel sleeve process while reducing the cost, complexity of equipment, and start-up time needed with such mandrel/sleeve process. The invention also provides reduced tooling costs, machine start-up times and reduced scrap generation.

The system of the present invention includes a stand alone mechanism for effecting sealing of a short length (¼" to ⅜") of label stock adjacent the trailing edge to a short length of label stock adjacent the leading edge to form a cylindrical sleeve which may be placed over a container and heat shrunk thereon to form the label. The stand alone mechanism is driven (either mechanically or electrically) to be synchronized with the mandrel turret and provides for introducing a heated surface, a flow of hot air, a solvent material or an adhesive to the sealing position between the overlap of the leading edge and trailing edge length of the label material as it completes being wrapped around the mandrel.

Under one embodiment, a nozzle rotates on one rotatable turret at a speed which matches the speed of a mandrel with a wrapped label rotating on a mandrel turret and, through a cam action, provides a dwell of the "nose" of the nozzle in the sealing area to provide means for sealing the trailing edge portion to the leading edge portion and then, through the cam action retracts from the seal area. In operation, the nozzle matches the speed of the label overlap, dwells, relative to the turret, for a portion of the turret rotation while supplying the heating or other adhesion means into a gap which is momentarily present between the trailing end portion and the leading end portion, and then retracts. The mechanism rotates a number of sealing devices in time with the various mandrels on the turret on which the mandrels are carried.

Since the nozzles are carried on a rotatable turret which is separate from the mandrel turret wrapping device, it has a significantly smaller mass than prior art mandrel-type machines. It can be brought up to operating temperature and speed quickly thereby reducing the start up times of the overall process.

SUMMARY OF THE INVENTION

The present invention is directed to applying a label of heat shrinkable plastic or other shrinkable material to a container by first wrapping a length of label stock around a mandrel to form a sleeve, sealing a short length of the trailing end of the label stock to a short length of the leading end, sliding the sleeve over a container and shrinking the sleeve around the container. One embodiment is characterized by the feature of carrying the rotatable mandrels which receive the label stock on a rotatable turret which is positioned adjacent to a second rotatable turret on which are mounted a plurality of nozzles having nose elements positioned for insertion in a gap between a short section of the leading end and a short section of the trailing end of the label stock as such label stock is being wound around the mandrel. The nozzles direct either heat into such gap in order to soften the label stock such that the trailing end segment will adhere to the outer surface of the leading end segment when such ends are brought into contact with one another or dispense an adhesive to either or both of the outer surface of the leading end segment or the inner surface of the trailing end segment such that the trailing end segment will adhere to the outer surface of the leading end segment when such trailing end segment is brought into contact therewith.

Under one embodiment, the nozzle for dispensing either heat or adhesive to such gap is carried on a rotatable turret with a cam mechanism which moves in a pair of cam grooves formed in a fixed member. The contour of the cam grooves are such as to permit the nose of the nozzle to be positioned in the gap between the leading and trailing ends of the length of label stock being wrapped on the mandrel for a short arcuate distance of travel, on the order of 20° to 40° with the preferred length of arcuate travel being on the order of 30°.

Under another embodiment, in lieu of utilizing a nozzle to extend into the gap momentarily formed between the leading end portion of the label material and the trailing end portion of the label material as the label material is wrapped around the mandrel, the sealing of the trailing end portion to the leading end portion may be effected by utilizing a heating element or susceptor in the mandrel. The susceptor is heated to a temperature sufficiently high to cause an interfacial bonding between the overlapped leading end portions and trailing end portion as they are brought into interfacial contact. A roller or an endless felt urged against the overlapped leading and trailing end portions on the mandrel may be utilized to urge the trailing end portion into interfacial engagement with the leading end portion.

Under one embodiment the susceptor may be heated by induction heating from an induction coil positioned slightly outside of the mandrel and the label being wrapped there around. Preferably the surface of the susceptor is slightly recessed from the outer periphery of the cylindrical mandrel in order to assure that the wrapped label does not come in contact with the heated surface of the susceptor until the overlapped leading and trailing end portions are urged there against by a sealer roller, belt or other means for urging them into interfacial contact.

Other objects and advantages of the present invention will become apparent to those skilled in the art upon a review of the following detailed description of the preferred embodiments and the accompanying drawings.

DETAILED DESCRIPTION OF THE PREFERRED EMBODIMENT(S)

Figure 1:
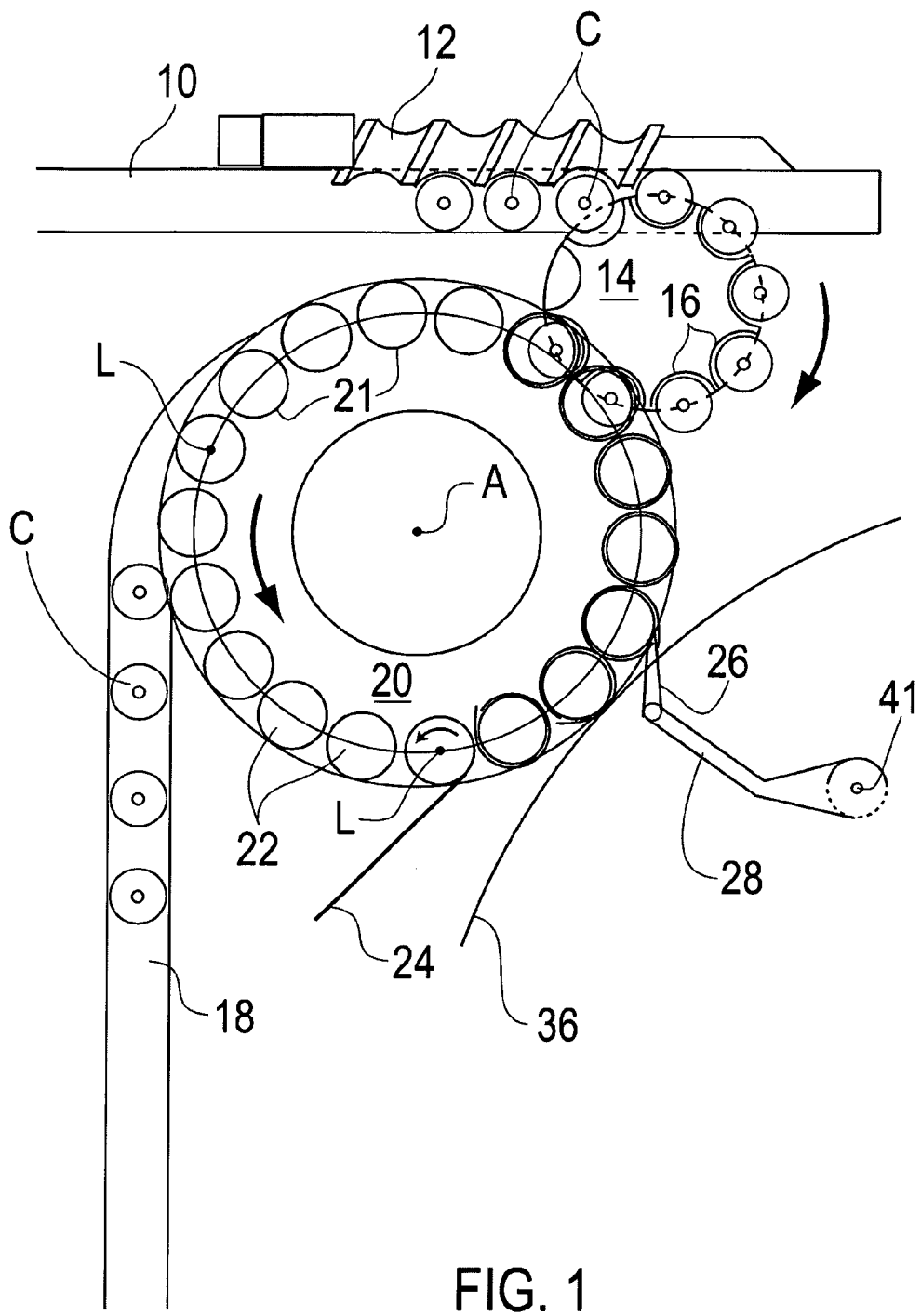
FIG. 1 is the top plan view of the overall system for labeling a container according to the present invention.

Referring to FIG. 1, there is shown schematically apparatus for applying labels to containers C in accordance with the teachings of the present patent application. Containers C are delivered on a conveyor 10 and transferred by a feed screw 12 to a rotary turret 14 having a plurality of pockets 16 for receiving the containers C and transferring them by clockwise rotary movement of the turret 14 to a label application station (not shown) at which label material 24 formed to cylindrical sleeves S as hereinafter described are slid over the containers C for delivery to a second conveyor 18 and a heating station (not shown) where such cylindrical sleeves are shrunk into close conformity with the outer surface of the containers C. Preferably the label material 24 is foam polystyrene; however, a wide variety of other heat shrinkable materials could be used.

Positioned at an elevation above of the turret 14 and the containers C carried in the pockets 16 thereof is a mandrel turret 20 which is rotatable in a counterclockwise direction about an axis A. The mandrel turret 20 has a plurality of outwardly facing pockets 21, each of which has positioned therein a mandrel 22. The mandrels 22 are mounted for rotation in a counterclockwise direction within the pockets 21 as the mandrel turret 20 rotates in a counterclockwise direction.

Thus, each mandrel 22 rotates counterclockwise about its own longitudinal axis L in its respective pocket 21 of mandrel turret 20 as the mandrel turret 20 carries them counterclockwise about axis A. In addition to being located at a higher elevation than the turret 14 carrying the containers C, the mandrel turret 20 is positioned such that, as the pockets 21 and the mandrels 22 carried thereby reach about the two o'clock position of each rotational movement, each mandrel 22 will briefly overlie a pocket 16 of the clockwise moving turret 14 and overlie the container C carried therein. During the interval at which a mandrel 22 is overlying a container C, the cylindrical sleeve being carried by such mandrel 22 is slid downwardly off of the mandrel and onto the container C. The containers with the substantially cylindrical sleeves telescoped thereover are then transferred sequentially from the pocket 16 of turret 14 to a removal turret (not shown) having a pocket or other removal means well known in the art and delivered to conveyor 18. The conveyor 18 will deliver the containers C with the sleeves loosely positioned thereon to a heating station where such sleeves are heated to a temperature at which they will shrink into engagement with the outer surface of its associated container, including those portions of the container which are indented from portions of the container C having a larger diameter.

Figure 2:
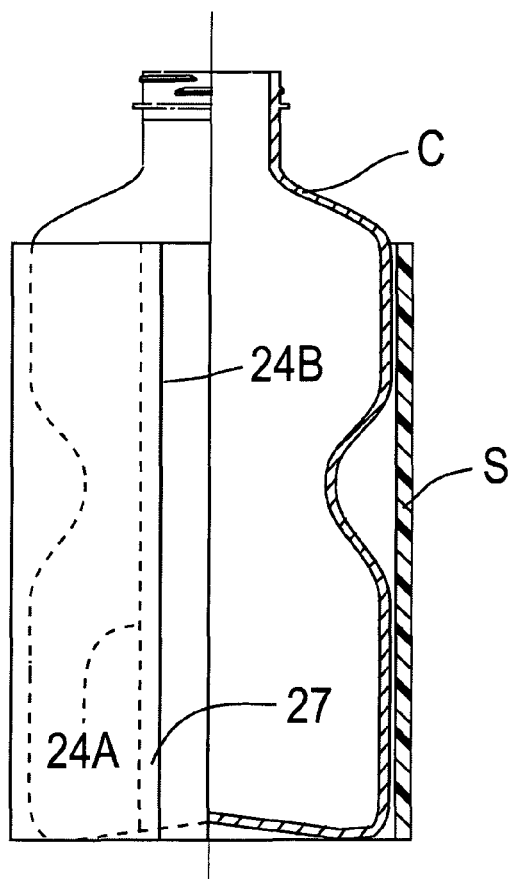
FIG. 2 is a view, partly in section, showing a container with a sleeve there-around immediately following transfer from a mandrel to a container but before heat shrinking.

FIG. 2 is a view, partly in section, showing container C with a sleeve S therearound immediately following transfer from a mandrel 22 to a container C but before heat shrinking. The sleeve S has a seam 27 formed by the overlap of the trailing end 24B of the label material over the leading end 24A. FIG.

3 is a view, partly in section, showing the container C after heating and shrinking of the sleeve to form a label L in snug engagement with the sidewall of the container C. It should be noted that the label engages all portions of the underlying wall surface including those portions having a smaller diameter than adjacent portions.

Figure 4:
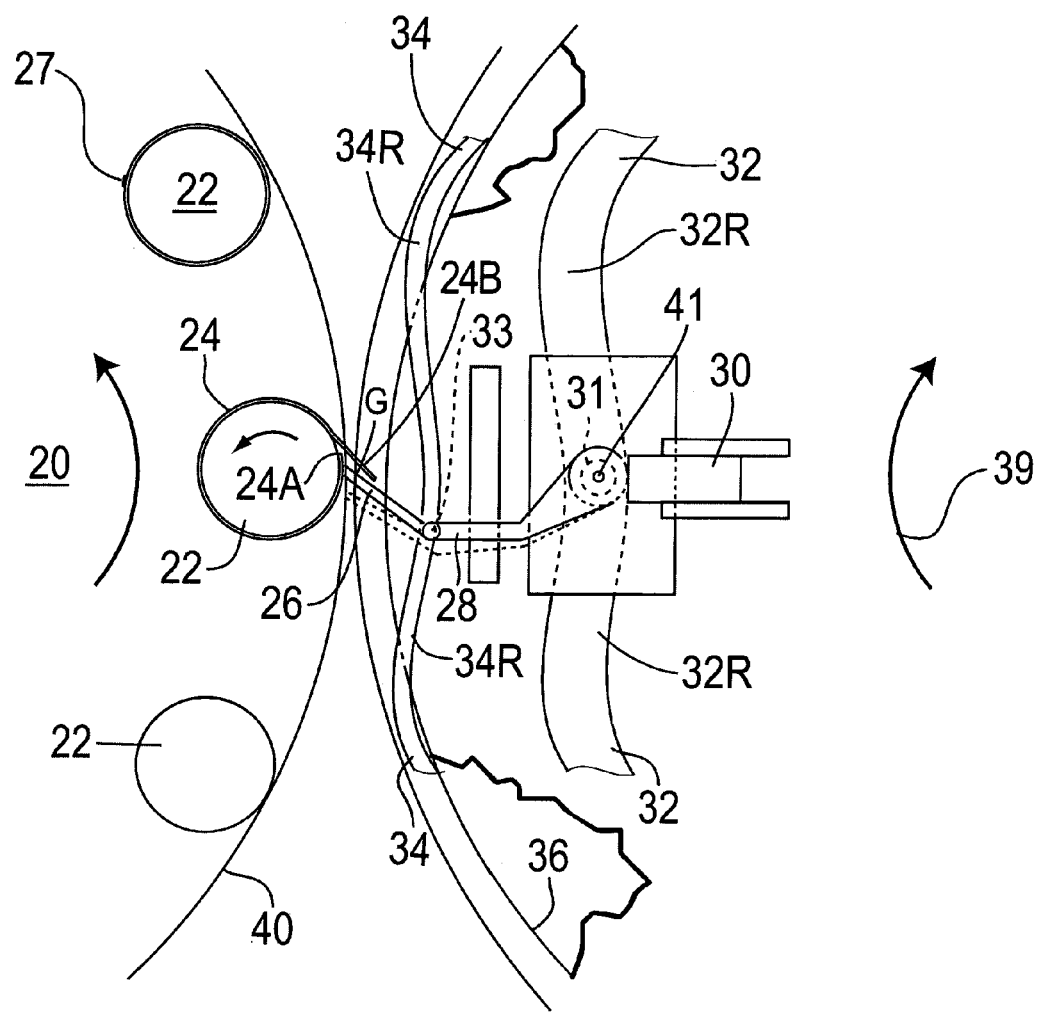
FIG. 4 is a fragmentary top plan view showing label stock material being wrapped around a mandrel carried on a rotatable turret and the dispensing nozzle carried on a second turret having a pair of cams, each engaged in a cam groove.
Figure 5:
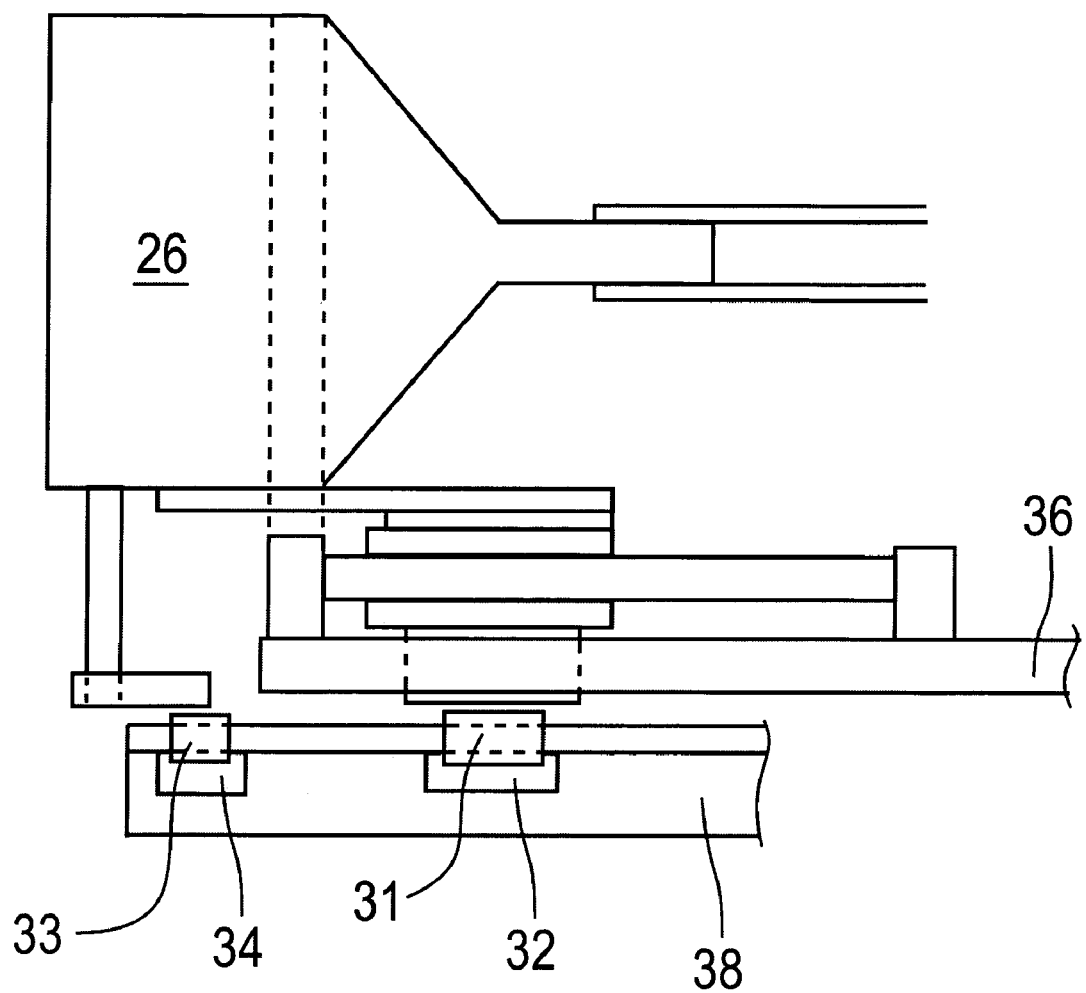
FIG. 5 is an elevational view of a portion of the apparatus shown in FIG. 4.

Referring now to FIGS. 4 and 5 there is shown one embodiment of apparatus for applying a length of label stock material 24 onto a mandrel 22 rotatable in a pocket 21 of a mandrel turret 20. The label stock 24 is cut from a roll of stock material to a length tailored to the diameter of the container C to which it is to be applied. Under the present invention, the length of label stock 24 to be used for any specific container will be dependent upon the size of such container and will be approximately one fourth to three-eighth inch greater in length than the circumference of the sleeve S. The circumference of the sleeve S is determined by its diameter which is slightly larger than the container C at its maximum diameter so that the sleeve S can readily be slid there over.

As Shown in FIG. 4, the leading edge 24A of the label stock 24 engages the rotating mandrel 22 and the label stock 24 is wrapped therearound as the mandrel 22 rotates. As the mandrel 22 completes the 360° rotation of the area engaged by the leading end 24A, the trailing end 24B of the label stock 24 and a short length adjacent thereto (on the order of one-fourth to three-eighth inch), will overly but will be out of contact with the leading end 24A and a similar length (one-fourth to three-eighth inch) adjacent thereto to thereby leave a gap G between the trailing end 24B and the short length adjacent thereto and the leading end 24A and short length adjacent thereto. As the mandrel 22 continues its rotation about its longitudinal axis L, such trailing end 24B and adjacent portion will be urged into contact with the outer surface of the leading end 24A and its adjacent portion thereby closing the gap G and sealing such adjacent portions to form a seam 27 as shown in FIG. 2. During this time, the mandrel turret 20 is rotating in a counterclockwise direction about axis A such that the outermost portion of the mandrels 22 follow a circular path 40. The leading end 24A and short length adjacent thereto defining one side of the gap G also follow such circular path.

Under the present invention, during the short interval in which there is a gap G prior to its closing by urging the trailing end portion 24B into engagement with the leading end 24A portion, successive ones of a plurality of nozzles 26 are inserted into such gap G and will either blow into such gap hot air of sufficient temperature to heat either or both of such leading end 24A portion or trailing end 24B portion to a temperature sufficient to cause such trailing end 24B portion to adhere to the leading end 24A portion to thereby form a seam 27 (see FIG. 2) or the nozzle 26 may squirt a solvent or an adhesive into the gap G to thereby form an adhesively sealed seam 27.

Apparatus for moving each of the respective nozzles 26 into and out of the successive gaps G includes, for each nozzle 26, an arm 28 which is pivotally mounted at pivot point 41 on a reciprocating member 30 which is mounted on a rotatable turret 36. The reciprocating member 30 is movable radially inwardly and outwardly toward and away from the mandrel turret 20 by means of a cam 31 positioned in a cam groove 32. A second cam 33 is positioned in a second cam groove 34. The cam grooves 32 and 34 are formed in a fixed plate 38 positioned below the turret 36. The second cam groove 34 is so contoured as to cause rotation of the arm 28 about pivot point 41 from a first position at which the nozzle 26 is spaced from the gap G (shown in dashed lines in FIG. 4) to a second position at which the nozzle 26 is positioned in the gap G (shown in full lines in FIG. 4) at a time when the first cam groove 32 causes the first cam 31 to move the arm 28 and nozzle 26 radially outwardly to a position at which the nozzle 26 may be moved into the gap G.

The arm 28, reciprocating member 30 and the cams 31 are mounted on the rotatable turret 36 which is rotatable clockwise, as indicated by arrow 39 about an axis B. See FIGS. 1, 4, 5 and 6. The cam grooves 32 and 34 follow a circular path in the fixed plate 38 in all areas except for the short area shown in FIG. 4 where they are each contoured to follow a reverse arcuate path 32R and 34R which are parallel to the arcuate path 30 followed by the outermost portions of the mandrels 22 as they are rotated by the mandrel turret 20. As the rotatable turret 36 rotates in a clockwise direction as indicated by arrow 39, the cams 31 and 33 move in their respective cam grooves 32 and 34 and are caused by such cam grooves 32, 34 to be extended radially outwardly when the cams 31 and 33 are in the reverse curve paths 32R and 34R, respectively, and to be retracted radially inwardly toward the axis of the rotatable turret 36 when they are beyond the reverse curve paths 32R and 34R. The movement of the cam 33 in the reverse curve path 34R also causes the arm 28 to pivot about pivot point 41 to carry the nozzle 26 first into and then out of the gap G.

As a result of the cams 31 and 33 following the reverse curve paths 32R and 34R of the respective cam grooves 32 and 34, the path followed by the nozzle 26 will be substantially the same as the path followed by the outermost surface of the rotatable mandrels 32 for a longer period of time than is possible if the nozzle 26 followed a fixed circular path throughout its rotational movement carried by the rotatable turret 36. Preferably, the extent of the reverse curve paths 32R and 34R are approximately 45° of the turret 36; however, it could be as much as 55°. Assuming the mandrel turret 20 has a diameter of 32 inches and the rotatable turret 36 has a diameter of 24 inches, the nozzle 26 would remain in the gap G for an extent of about 30° to 40° of arcuate movement of the mandrels 22. This permits the nozzle 26 to blow hot air into the gap G for a longer period of time then would be possible if the nozzle 26 followed a simple circular path at a fixed radius from the axis B of the rotatable turret 36.

As previously discussed, as a result of the feature of the outer end of the arm 28 having a second cam 33 following a second cam groove 34, the arm 28 is caused to pivot slightly with respect to the axis 41 of its connection with the reciprocating member 30. As a result, the arm 28 will be moved a short distance in a clockwise direction as the cam 33 changes direction in its movement from a circular path of cam groove 32 to a path following the reverse curve portion of groove path 34R in order to move the nozzle 26 into position in the gap G between the leading end 24A portion of the label stock 24 and the trailing end 24B portion. When the cam 33 reaches the opposite end of the reverse curve path 34R changing from the reverse curve back to the outwardly convex curve path, the cam 33 causes the arm 28 to be retracted slightly in a counterclockwise direction to remove the nozzle 26 from the gap G immediately prior to the trailing end 24B portion of the label stock 24 being urged into sealing engagement with the leading end 24A portion.

Figure 6:
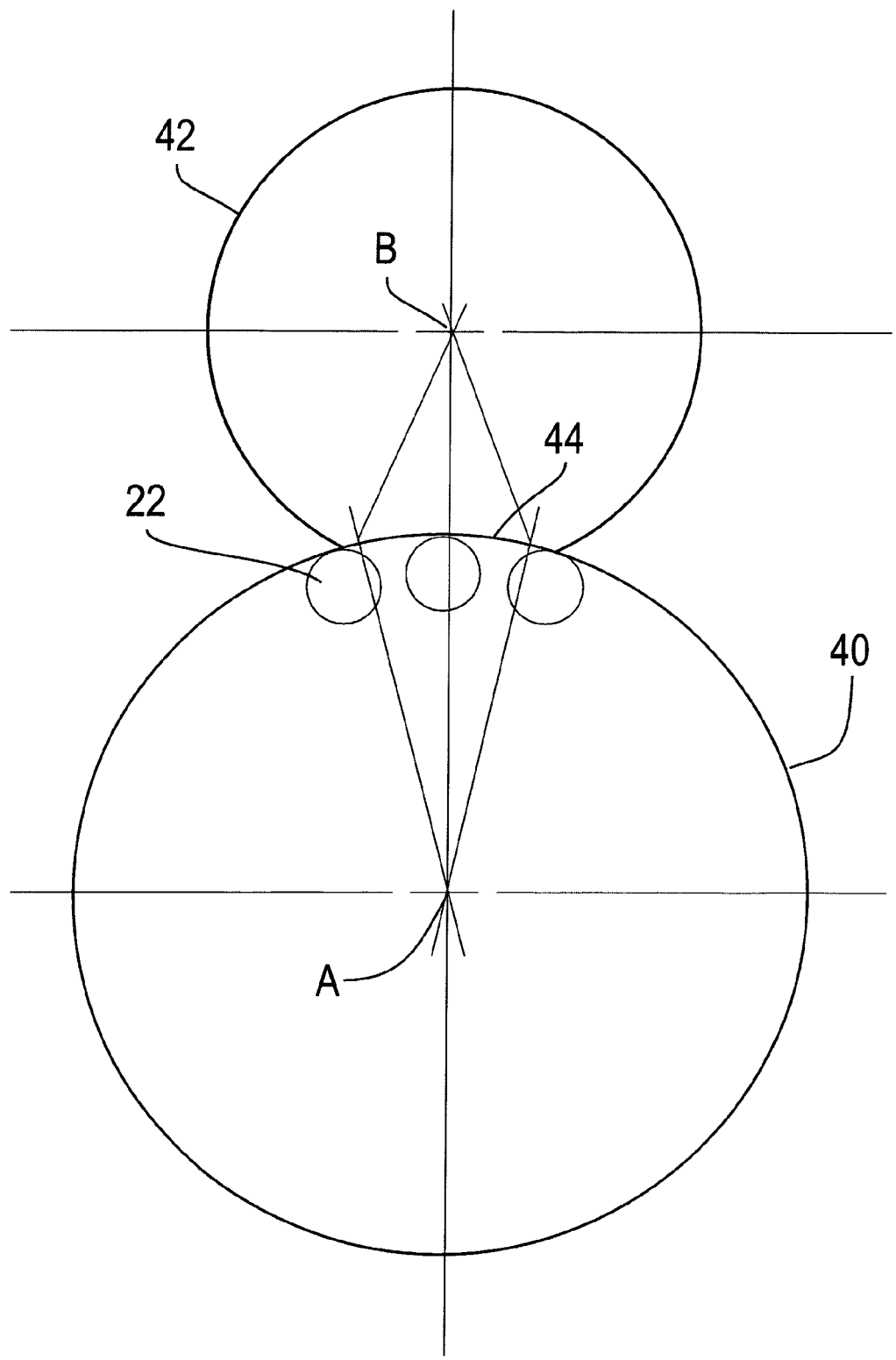
FIG. 6 is a schematic representation of the paths followed (1) by the outermost surface of the mandrels and (2) by the nozzles.

FIG. 6 is a schematic representation showing, in the lower segment, the circular path 40 of movement followed by the outside diameters of the mandrels 22 as they are rotated on the mandrel turret 20 about axis A. FIG. 6 shows, in the upper segment, the path followed by the tip of each nozzle 26 as it is rotated on the rotatable turret 36 about axis B. As can be seen clearly in FIG. 6, the nozzle 26 follows an outwardly convex circular path 42 about the major portion of its rotational cycle and an irregular inwardly concave path 44 (inwardly towards axis B) for a shorter distance, on the order of about 45° of movement by the rotatable turret 36. By virtue of the differing diameters of the rotatable turret 36 and the mandrel turret 20, the arcuate length of overlap of the inwardly concave path 44 of the nozzle 26 as a result of the reverse curve paths 32R and 34R is approximately 30 degrees of arc with reference to the mandrel turret 20 and its circular path 25 about axis A. Preferably, the rotatable turret 36 has a diameter of approximately 24 inches and has mounted thereon twelve nozzles 26. In contrast the mandrel turret 20 may have a diameter of approximately 32 inches with eighteen mandrels 22 mounted thereon.

Figure 3:
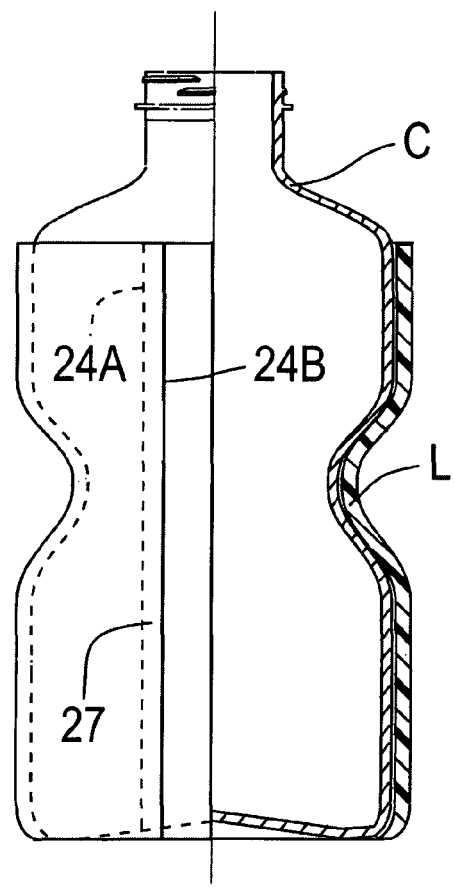
FIG. 3 is a view, partly in section, showing the container after heating and shrinking of the sleeve to form a label in snug engagement with the sidewall of the container.
Figure 7:
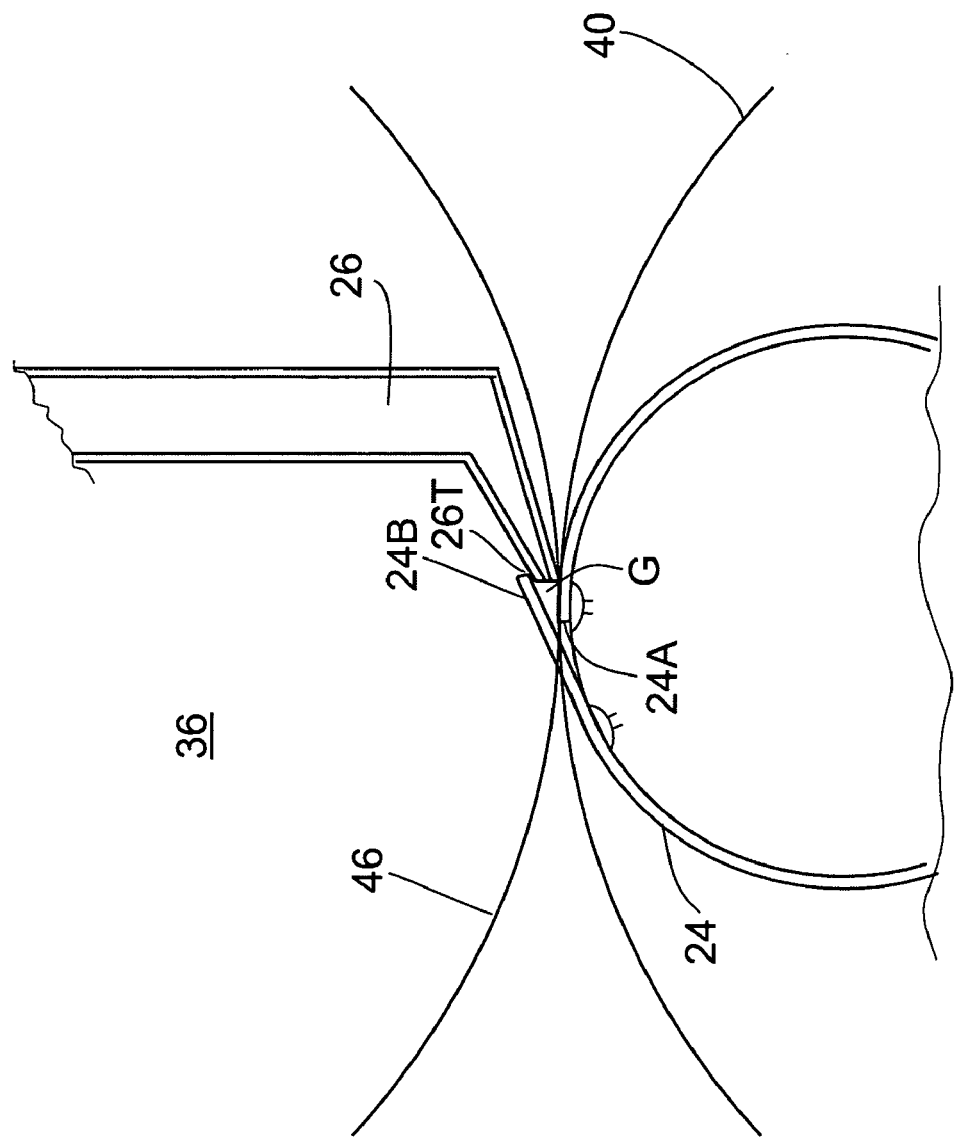
FIG. 7 is a modified embodiment in which the dispensing nozzle is rigidly mounted on the second turret so that the nose or dispensing end of the nozzle follows only a circular path and is positioned in the gap between the trailing edge and leading edge of label material only for an instant as there is no overlap of the circular path traveled by the outer edge of the mandrel and the circular path of the dispensing end of the nozzle.

Referring to FIG. 7 there is shown a modified embodiment in which the nozzle 26 is rigidly mounted on a rotatable turret 36 such that the tip 26T of the nozzle 26 follows a constant circular path 46 about the axis B of the rotatable turret 36. As a result there is no overlap of the circular path 46 of the nozzle tip 26T and the circular path 40 of the outer surface of the mandrels 22 rotating about axis A. Under this embodiment the nozzle tip 26T is positioned in the gap G for only an instant. This obviously results in a shorter period for heating or dispensing solvent or adhesive than is permitted in the embodiment of FIGS. 4-6. Under this embodiment, in the case of heating, the heated air is at a higher temperature than that utilized in the embodiment of the FIGS. 1-4. In addition, in order to heat the leading 24A and trailing end 24B portions of the label stock 24, the respective mandrel turret 20 and rotatable turret 36 will be operated at a slower speed than is possible with the embodiment of FIGS. 2-4. The embodiment of FIG. 7 is also well suited for applying solvent or adhesive into the gap G rather than hot air in order to form a seal between the leading and trailing ends of the label stock 24.

Figure 8:
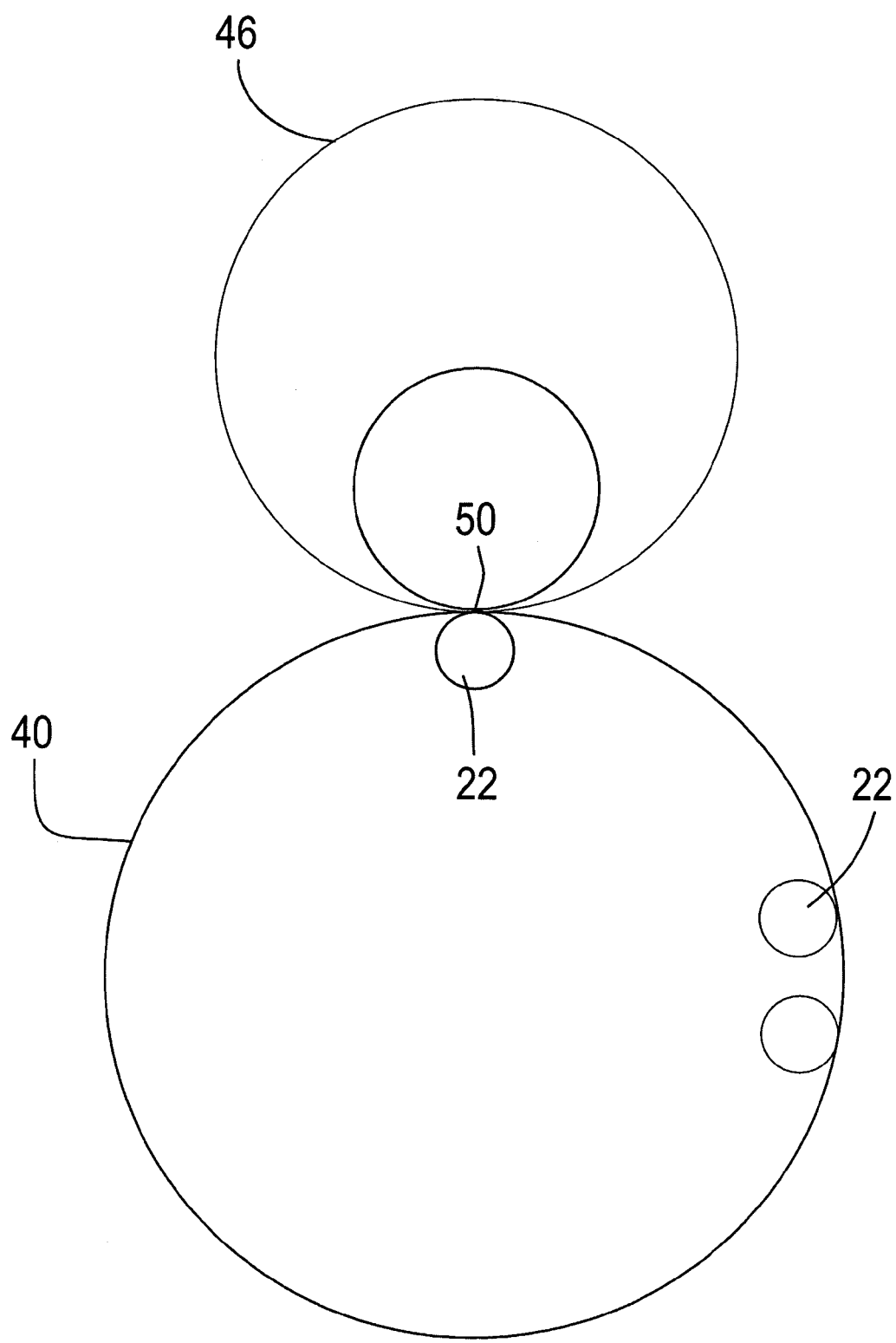
FIG. 8 is a schematic representation of the paths followed (1) by the outermost surface of the mandrels and (2) by the nozzles for the embodiment of FIG. 7.

Referring to FIG. 8, there is shown schematically the rotatable paths followed by the outer diameter of the mandrels 22 and by the tip 26T of the nozzle 26 under the embodiment of FIG. 7. As can be seen the path 46 of the nozzle tip 26T is circular and meets the circular path 40 of the outermost portion of the mandrels only at a single point of contact 50.

Figure 9:
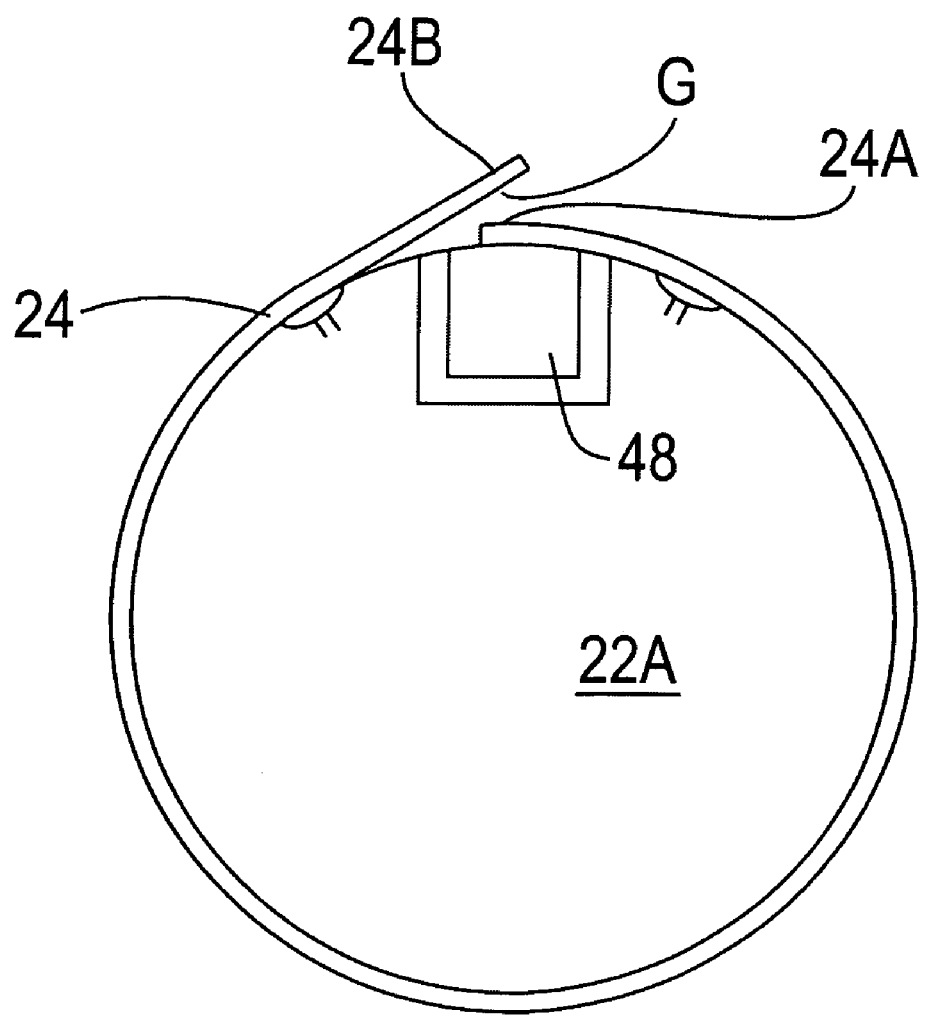
FIG. 9 is a top plan view showing a further embodiment with a heater in a discrete portion of the mandrel.

FIG. 9 is a modified embodiment under which the mandrel turret 22A is provided with a ferrous core 48 which is heated electrically by induction. The ferrous core 48 is so positioned with respect to each mandrel 22A as to be aligned with the leading end 24A and trailing end 24B of the label stock material 24. As a result the leading edge 24A will be heated by the ferrous core to a temperature sufficiently high to cause the trailing end 24B to become sealed thereto when urged there against by a sealing roller.

Figure 10:
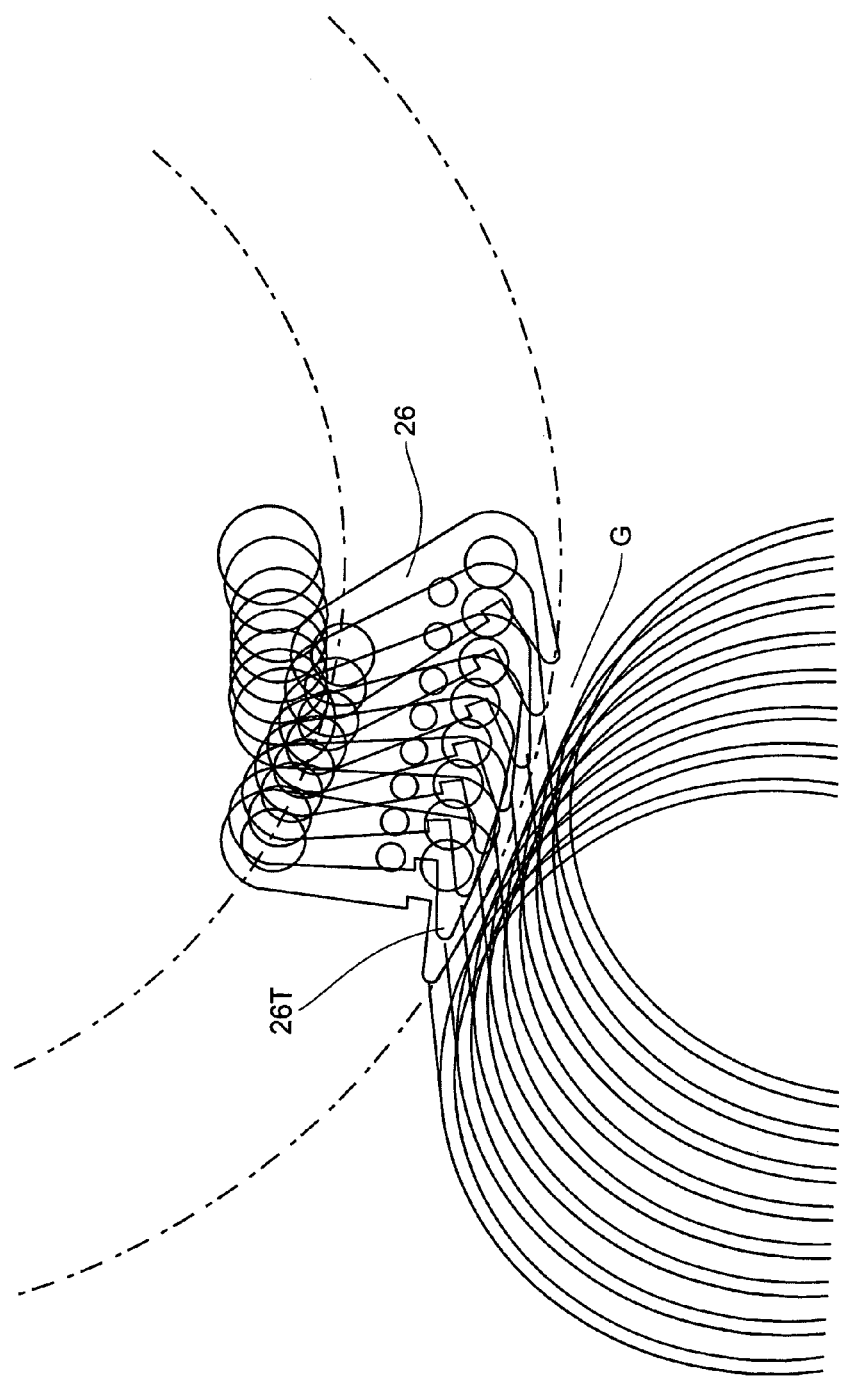
FIGS. 10 and 11 are schematic views showing positioning of the nozzle in the gap at various arcuate positions under the embodiment of FIGS. 4-6.
Figure 11:
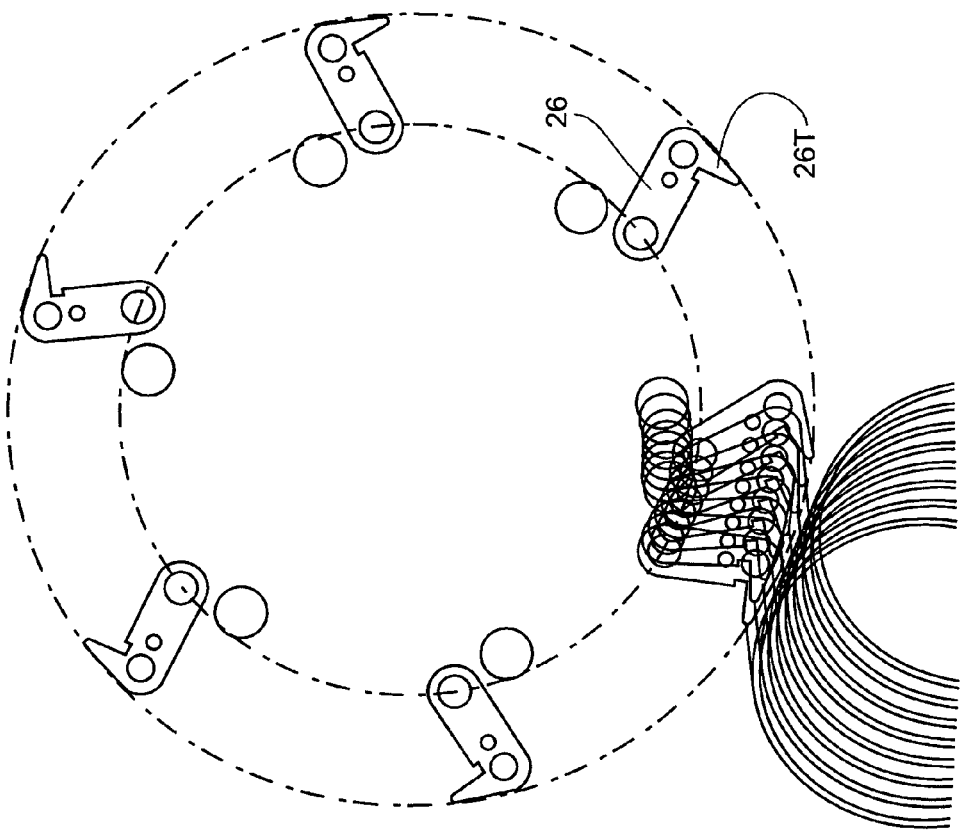

FIGS. 10 and 11 are schematics representation showing the positioning of the tip 26T of the nozzles 26 in the gaps G between the leading and trailing ends of the label stock during the interval of short 30° overlap as described in the embodiment FIGS. 4-6.

Figure 12:
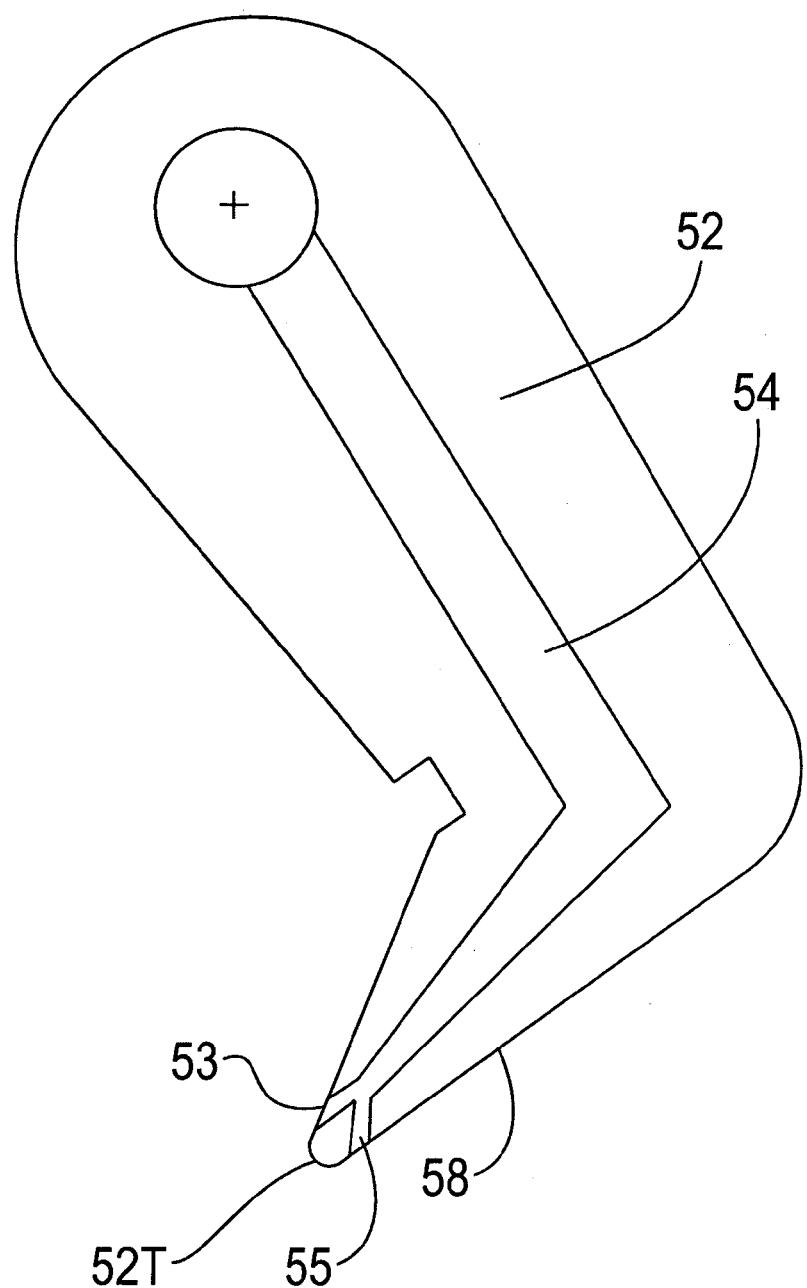
FIG. 12 is a top plan view of a modified nozzle.

FIG. 12 is a modified nozzle 52 having a passageway 54 extending to its tip 52T for the flow of heated air to the gap between the leading and trailing ends of the label stock being wrapped around a mandrel. The passageway 54 adjacent the tip 52T is bifurcated to form a first outlet opening 53 directing heated air to the inner surface of the trailing end 24B and a second outlet opening 55 directing heated air to the outer surface of the leading end 24A. Additionally, the modified nozzle 52 has a coating of Teflon® over a flat surface 58 for engagement with the outer surface of the leading end 24A portion of label stock 24 to provide pressure heating of such leading end portions.

Referring to FIGS. 13-17, there is shown another embodiment of the present invention utilizing a different means for effecting a seal between the leading end portion and the trailing end portion of the sleeve as it is wrapped around a mandrel.

Figure 13:
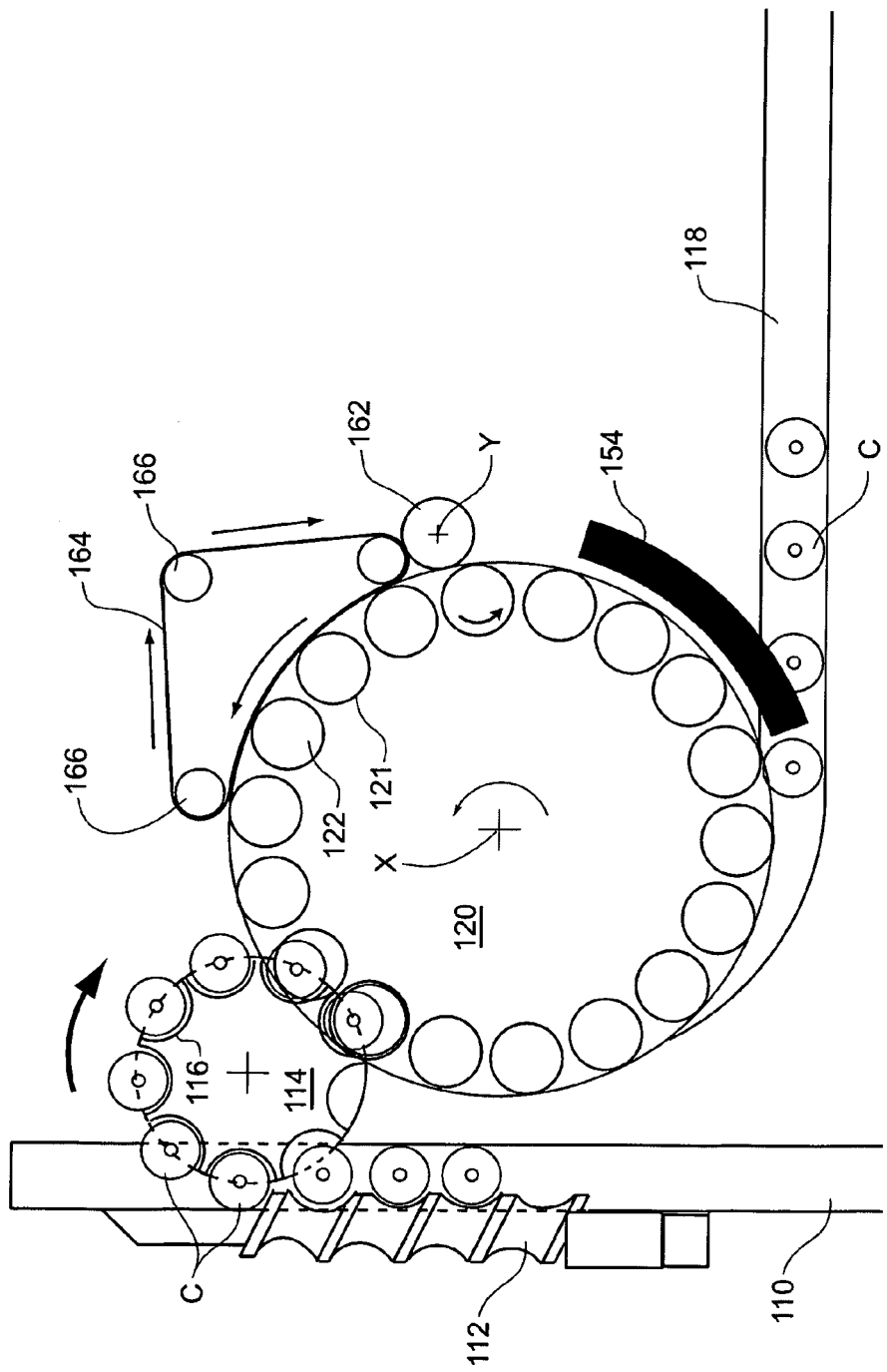
FIG. 13 is a modified embodiment showing the utilization of a susceptor mounted on the mandrel and an induction coil for heating the susceptor.

There is shown schematically in FIG. 13 a top plan view of modified apparatus for applying labels to containers. Containers C are delivered on a conveyor 110 and transferred by a feed screw 112 to a rotary turret 114 having a plurality of pockets 116 for receiving the containers C and transferring them by clockwise rotary movement of the turret 114 to a label application station (not shown) at which label stock formed to cylindrical sleeves as hereinafter described are slid over the containers C for delivery to a second conveyor 118 and a heating station (not shown) where such cylindrical sleeves are shrunk into close conformity with the outer surface of the containers C.

Positioned at an elevation above of the turret 114 and the containers C carried in the pockets 116 thereof is a mandrel turret 120 which is rotatable in a counterclockwise direction about an axis X. As in the previous embodiment, the mandrel turret 120 has a plurality of outwardly facing pockets 121, each of which has positioned therein a mandrel 122. The mandrels 122 are mounted for rotation in a counterclockwise direction within the pockets 121 as the mandrel turret 120 rotates in a counterclockwise direction. In addition to being located at a higher elevation than the turret 144 carrying the containers C, the mandrel turret 120 is positioned such that, as the pocket 121 and the mandrel 122 carried thereby reach about the ten o'clock position of each rotational movement, each mandrel 122 will briefly overlie a pocket 116 of the clockwise moving turret 114 and overlie the container C carried therein. During the interval at which a mandrel 122 is overlying a container C, the cylindrical sleeve being carried by such mandrel 122 is slid downwardly off of the mandrel and onto the container C. The containers with the substantially cylindrical sleeves telescoped thereover are then transferred sequentially from the pocket 116 of turret 114 to a conveyor 118. The conveyor 118 will deliver the containers C with the sleeves loosely positioned thereon to a heating station where such sleeves are heated to a temperature at which they will shrink into engagement with the outer surface of its associated container including those portions of the container which are indented from portions of the container C having a larger diameter.

In contrast to the previous embodiment which effected a seal between the leading end portion 24A and trailing end portion 24B of the label material 24 sleeve by introducing sealing means into the gap between the leading end portion 24A and trailing end portion 24B as the label material is wrapped around the mandrel, the present embodiment heats the leading end portion 24A of the label material 24 as it is wrapped around the mandrel 122. It is heated to a temperature at which the trailing end portion 24B can be sealed thereto upon being urged thereagainst. The heating of the leading end portion 24A of the label material is effected by a hot susceptor 160 carried by each rotating mandrel 122 in a slotted recess 156 thereof. See FIGS. 14 and 15. Preferably, the susceptor 160, which is formed of metal, is heated by an induction coil 154 which is curved in a short arc in closely spaced relationship to the path followed by the outer surface of the mandrels and the label material being wrapped therearound. The induction coil 154 is located at a position to heat the susceptor immediately prior to the trailing end 24B reaching a position overlying the leading end 24A. Under this embodiment the mandrel 122 is formed of a hard plastic such as nylon or other suitable plastic. As shown in FIG. 13, the induction coil 154 may be positioned in closely spaced relationship to the mandrel 122 following an arcuate path parallel to the path followed by the mandrel outer surfaces during rotation of the mandrel turret 120.

Figure 14:
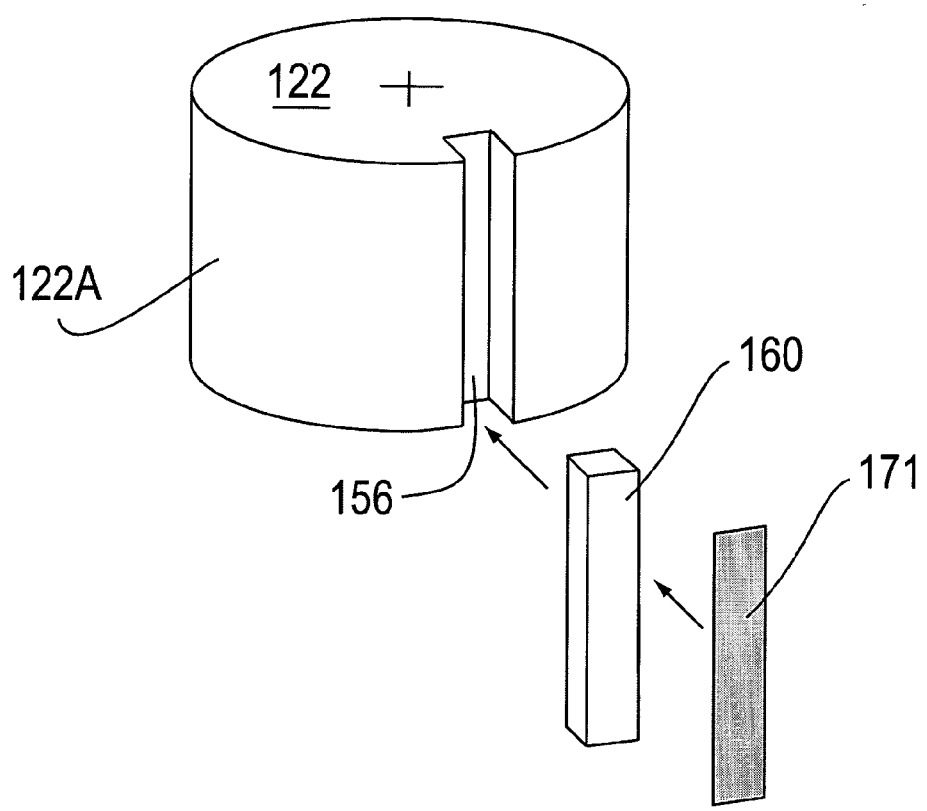
FIG. 14 is an exploded perspective view showing the mandrel and susceptor.
Figure 15:
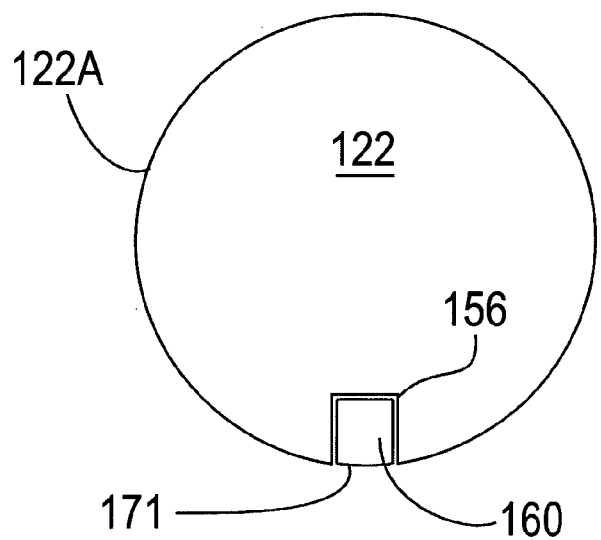
FIG. 15 is a top plan view of the mandrel with the susceptor positioned therein.
Figure 16:
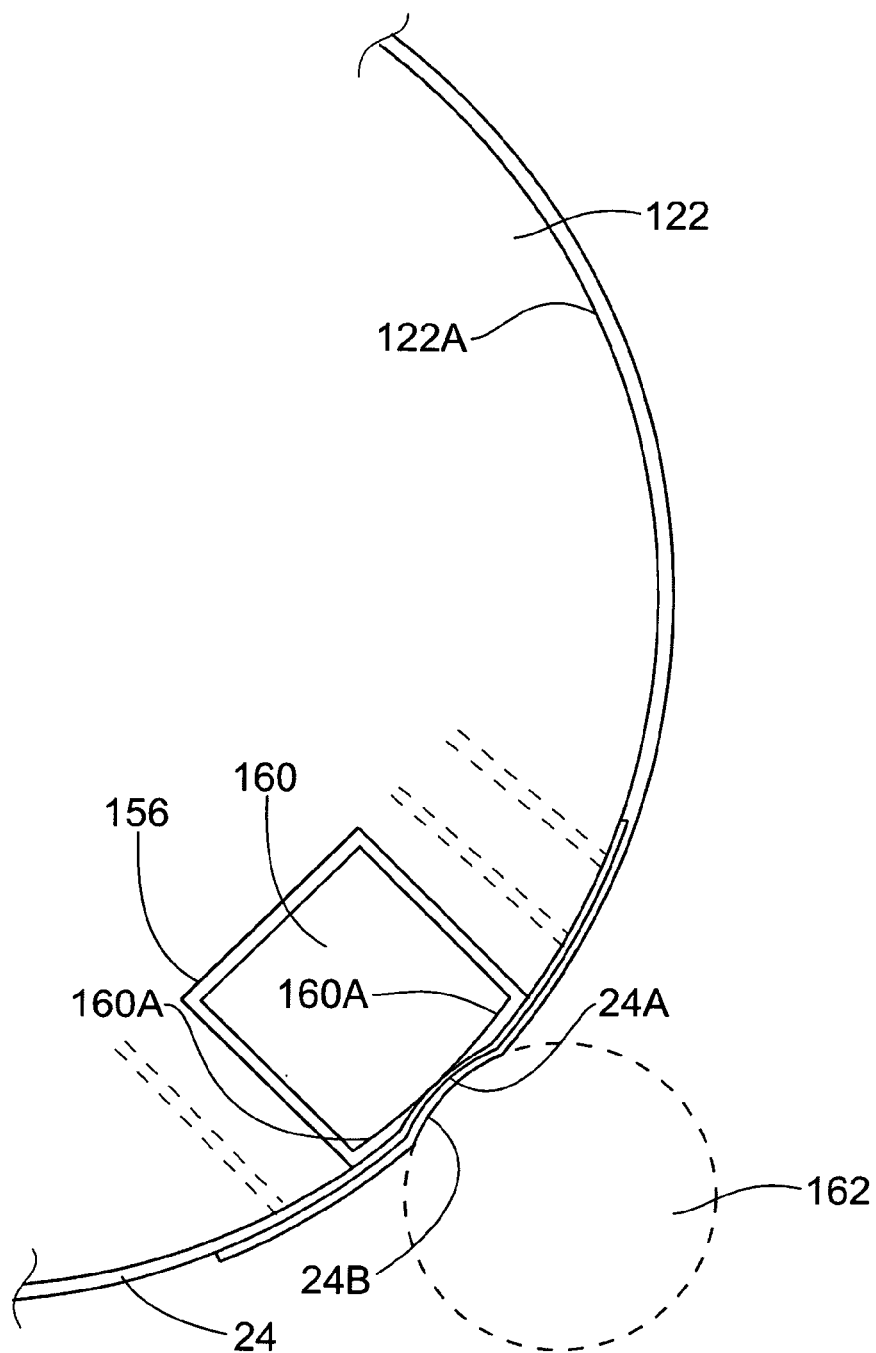
FIG. 16 is a top plan view of a portion of the mandrel and susceptor and a cooperating roll-down roller.

As may be seen in FIGS. 14-16, each mandrel 122 is provided with an axially extending slot 156 inwardly from the outer surface 122A and extending substantially the full height of the mandrel 122. Mounted in the axial slot 156, is a susceptor 160 formed of a metal such as steel which can readily be heated by the induction coil 154 as the susceptor 160 passes thereby during rotation of the mandrel turret 120 and the mandrel 122 positioned in the pocket 116 thereof. The susceptor 160 has a length which is substantially equal to the full height of the mandrel 122 in order that the full height of the leading end portion of the sleeve material being heated will be heated. Preferably a layer of Teflon® 171 or other antistick medium will be applied to the outer surface of the susceptor.

As may be seen in FIGS. 13 and 16, a seal roll 162 is mounted for (1) rotation about an axis Y parallel to axis X and (2) movement away from and into a position to urge the trailing end portion 24B of the label material 24 into sealing engagement with the leading end portion 24A shortly after the susceptor 160 leaves a position aligned with the induction coil 154 heating it.

As may be seen in FIG. 13, in lieu of a seal roll 162 for urging the trailing end 24B of the label material 24 into sealing engagement with the leading end 24A, a belt 164 rotating around a plurality of pulleys 166 maybe utilized to urge the trailing end portion 24B of the label material against the heated leading end portion 24A.

Referring to FIG. 16, there is shown a modified embodiment using the susceptor 160 for effecting the seal between the trailing end portion 24B and the leading end portion 24A. Under this embodiment the susceptor 160 is sized and so positioned within the axial slot 156 such that the outer face 160A thereof is slightly recessed from the outer cylindrical face 122A of the mandrel 122. By providing the slight recess of the outwardly facing surface 160A of the susceptor relative to such outer cylindrical face 122A, the leading end portion 24A of the label material 24 is maintained out of contact with such susceptor outer face 160A until the trailing end portion 24B has been wrapped to an overlying position, at which time the seal roll 162 will force such mating end portions 24B and 24A into engagement with the recessed outer face 160A of the heated susceptor 160.

Figure 17A:
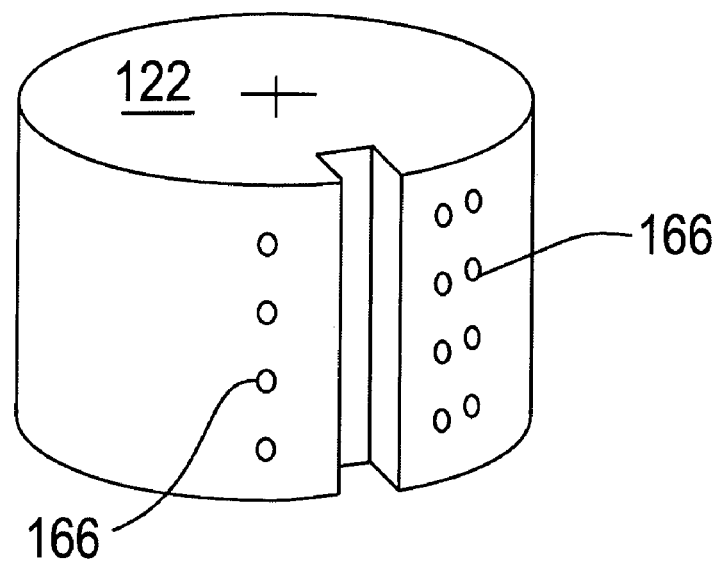
FIGS. 17A and 17B are views showing vacuum holes in the mandrel adjacent a recess for receiving the susceptor.
Figure 17B:
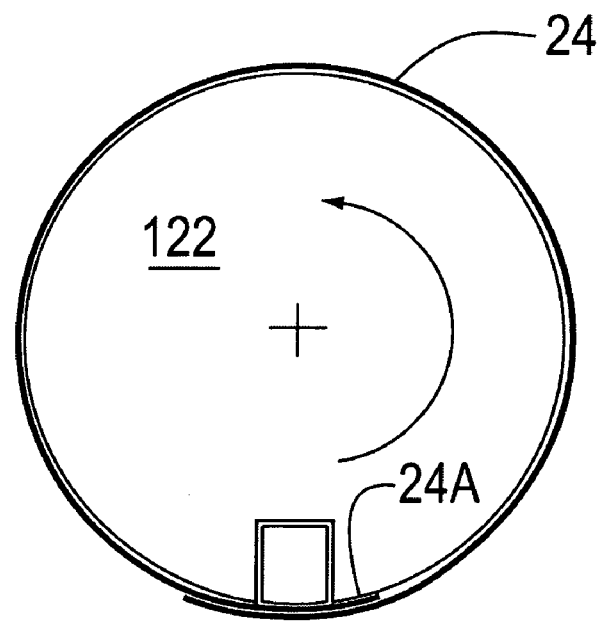

Referring to FIGS. 17A and 17B there is shown a preferred embodiment of the mandrel 122 in which there is provided a plurality of vacuum label holding holes 166 for holding the leading end portion 24A of the label material 24 being wrapped therearound to retain such leading end portion in position against the mandrel outer surface 122A so that such label material 24 does not inadvertently drift into contact with the heated susceptor 160 prior to being urged there against by the seal roll 162. The vacuum holes 166 are also shown in phantom in FIG. 16.

The present invention has potential uses other than labeling containers. For example, it could be utilized for forming cups or other articles having sidewall portions which taper inwardly from top to bottom. Such articles could be formed readily and economically by simply forming a cylindrical sleeve as described herein and sliding such cylindrical sleeve axially off of the cylindrical mandrel and onto a tapered mandrel which then carries the cylindrical sleeve to a heating station for heating and shrinking such cylindrical sleeve into conformity with the tapered mandrel.

As is well known in the art of manufacturing cups, prior to placing the cylindrical sleeve onto the tapered mandrel, a flat plastic disc is positioned on the small end of the mandrel. The end of the cylindrical sleeve will extend axially beyond such mandrel small end and, upon heating and shrinking the cylindrical sleeve, the portion extending axially beyond will shrink radially inwardly to a position where it can be urged axially by a tamp into sealing engagement with the plastic disc to form a bottom for such cup.

The above detailed description of the present invention is given for explanatory purposes. It will be apparent to those skilled in the art that numerous changes and modifications can be made without departing from the scope of the invention.

The invention claimed is:

1. A method for labeling a container having a body portion comprising the steps of:
    (a) wrapping a length of label material around a cylindrical mandrel rotating about its own axis, said length of label material having a leading end portion which makes initial contact with said mandrel and a trailing end portion which overlaps said leading end portion upon completion of said wrapping, said trailing end portion defining a gap spaced from said leading end portion immediately prior to said completion;
    (b) causing said mandrel to be rotated about a second axis such that the outer periphery of said mandrel follows a path defining a circle;
    (c) causing a nozzle for dispensing a medium of heated gas or liquid to be rotated about a third axis spaced outwardly from said circle defining path of said mandrels, said nozzle following an outwardly convex path throughout a major portion of its rotation about said third axis;
    (d) dispensing said medium from said nozzle into said gap;
    (e) urging said trailing end portion into sealing engagement with said overlapped leading end portion to form a label blank; and
    (f) positioning said label blank around said body portion.

2. The method according to claim 1 wherein said nozzle is mounted for rotation along an annular path including a major segment lying outside of said circle and a minor segment following the path of said circle and further including the step of causing said nozzle to dispense said medium into said gap while said nozzle is moving along said minor segment.

3. A method for preparing a label for affixing to a container comprising the steps of:
    (a) wrapping a length of label material around an outer surface of a rotating cylindrical mandrel, said length of label material having a leading end portion which makes initial contact with said mandrel and a trailing end portion which overlaps said leading end portion upon completion of said wrapping, said trailing end portion defining a gap spaced from said leading end portion immediately prior to said completion;
    (b) rotating said mandrel about its own axis in a first direction;
    (c) carrying said mandrel along a rotational path in the same direction as said first direction, said rotational path being about a second axis spaced from said mandrel axis such that the path followed by the outer surface of said mandrel is circular;
    (d) moving a nozzle along an annular path, said annular path including a major segment lying outside of said circular path and a minor segment following said circular path;

(e) causing said nozzle to dispense into said gap a medium for causing said trailing end portion to adhere to said leading end portion while said nozzle is moving along said minor segment; and (f) urging said trailing end portion into sealing engagement with said leading end portion to form a label blank.

4. A method for forming a cup having an upper portion and tapering inwardly to a smaller portion having a body portion, said body portion including an upper end and a lower end, said upper end having a larger cross sectional size than said lower end, comprising the steps of:

(a) rotating a cylindrical mandrel in a first direction about its own axis and causing said mandrel to be rotated about a second axis such that the outer periphery of said cylindrical mandrel follows a path defining a circle;

(b) wrapping a length of plastic material around said rotating cylindrical mandrel, said length of material having a leading end portion which makes initial contact with said mandrel and a trailing end portion which overlaps said leading end portion upon completion of said wrapping, said trailing end portion cooperating with said leading end portion to define a gap spaced from said leading end immediately prior to said completion;

(c) providing a nozzle for dispensing heated gas or liquid medium, said nozzle being mounted for rotation along an annular path, said annular path including a major segment lying outside of said circle and a minor segment following the path of said circle;

(d) causing said nozzle to dispense said medium into said gap while said nozzle is moving along said minor segment;

(e) urging said trailing end portion into sealing engagement with said leading end portion to form a cylindrical blank (f) transferring said cylindrical blank to a tapered mandrel, said tapered mandrel having a larger cross sectional size in a first area than in a second area; and (g) shrinking said cylindrical blank into engagement with said tapered mandrel.

5. The method according to claim 4 wherein said tapered mandrel has an end adjacent said second area and said cylindrical blank, following step (e), extends axially beyond said end and further including the step of positioning a plastic disc on said end prior to step (f), said shrinking step causing said axially extending portion to shrink radially inwardly and urging said radially shrunk portion into sealing engagement with said plastic disc.

6. A method for forming an article having a body portion extending along an axis, said body portion having a larger cross section size in a first axial area than in a second axial area, comprising the steps of:

(a) rotating a cylindrical mandrel about its own axis in a first direction;

(b) carrying said cylindrical mandrel along a rotational path in the same direction as said first direction, said rotational path being about a second axis spaced from said cylindrical mandrel axis such that the path followed by the outer surface of said cylindrical mandrel is circular;

(c) wrapping a length of shrinkable material around an outer surface of said cylindrical mandrel such that the trailing end portion overlaps the leading end portion upon completion of said wrapping; said trailing end portion cooperating with said leading end portion to define a gap spaced from said leading end portion immediately prior to said completion;

(d) moving a nozzle along an annular path, said annular path including a major segment lying outside of said circular path and a minor segment following said circular path;

(e) causing said nozzle to dispense a medium into said gap while said nozzle is moving along said minor segment;

(f) sealing said trailing end to said leading end portion to form a cylindrical blank;

(g) sliding said cylindrical blank off of said cylindrical mandrel;

(h) positioning said cylindrical blank around a non-cylindrical member; and (i) shrinking said shrinkable material into engagement with said non-cylindrical member.

7. The method according to claim 1 further including the steps of:

(g) causing said nozzle to follow an outwardly concave path throughout a minor portion of its rotation about said third axis, said outwardly concave path being parallel to said circle defining path of said mandrels.

\* \* \* \* \*